United States Patent [19]

Sekine et al.

[11] Patent Number: 4,983,143
[45] Date of Patent: Jan. 8, 1991

[54] ELASTICALLY COUPLED JOINT

[75] Inventors: Hiroshi Sekine; Mikio Yamaguchi, both of Takasaki; Kiyoshi Sadakata, Azumamura Kunisada; Yuichiro Fukunaga, Maebashi, all of Japan

[73] Assignee: Nippon Seiko Kabushiki Kaisha, Tokyo, Japan

[21] Appl. No.: 298,490

[22] Filed: Jan. 18, 1989

[51] Int. Cl.$^5$ .......................... B62D 1/16; F16D 3/76
[52] U.S. Cl. .......................... 464/89; 74/492; 464/160
[58] Field of Search .............. 74/492; 464/89, 90, 464/112, 160

[56] References Cited

U.S. PATENT DOCUMENTS

| 2,032,900 | 3/1936 | Alger | 464/89 X |
| 2,262,512 | 11/1941 | Musselman | 464/89 |
| 2,727,368 | 12/1955 | Morton | 464/89 |
| 2,900,809 | 8/1959 | Crankshaw | 464/89 |
| 3,428,155 | 2/1969 | Binder et al. | 464/91 X |
| 3,541,810 | 11/1970 | Kendall | 464/89 |
| 3,878,695 | 4/1975 | Pitner | 464/89 |
| 4,183,258 | 1/1980 | Stephan | 464/89 X |
| 4,385,897 | 5/1983 | Mallet | 464/89 |
| 4,465,037 | 8/1984 | Tanaka | 464/90 X |

FOREIGN PATENT DOCUMENTS

| 2391390 | 1/1979 | France | 464/89 |
| 45-7525 | 3/1970 | Japan . | |
| 57-17872 | 1/1982 | Japan . | |
| 1090682 | 11/1967 | United Kingdom . | |
| 1111160 | 4/1968 | United Kingdom . | |

Primary Examiner—Daniel P. Stodola
Attorney, Agent, or Firm—Shapiro and Shapiro

[57] ABSTRACT

An elastically coupled joint comprises a shaft for transmitting rotary motion, a housing in which the shaft is concentrically inserted, an elastic member provided between the shaft and the housing, and a stopper for preventing excessive displacement between the shaft and the housing. The housing is provided, at an end thereof with a yoke for supporting a spider of a universal joint. The elastic member is provided with a tubular outer ring and a cylindrical elastic body fixed on the inner side of the outer ring. The shaft is pressure fitted into the central portion of the elastic member. The stopper is composed of a pin member inserted in a penetrating hole formed in the housing, the elastic member and the shaft. The penetrating hole may be formed such that the stopper pin is received in the shaft with a press fit, with each end portion of the pin having a predetermined uniform circumferential gap to the housing and the outer ring.

6 Claims, 2 Drawing Sheets

ELASTICALLY COUPLED JOINT

BACKGROUND OF THE INVENTION

1. Field of the Invention

The present invention relates to an elastically coupled joint capable of absorbing vibration, and in particular to an improvement on an elastically coupled joint employed in a steering mechanism of a vehicle.

2. Related Background Art

FIGS. 6 and 7 show an example of an elastically coupled joint provided in a steering shaft for absorbing the vibration of wheels resulting from the movement of a vehicle or the vibration of engine, thereby isolating the steering wheel from such uncomfortable vibration. In particular, FIGS. 6 and 7 show a torque transmitting assembly, as disclosed in the U.S. Pat. No. 3,878,695, composed of a sleeve 15 of an elastomer fitted in a radially compressed state between a shaft 13 and a concentric tubular member 14, and a washer 17 fixed on said shaft and having a projection 16 loosely engaging with a notch provided at an end of said tubular member.

In another example of prior technology Japanese Laid-open Utility Model No. 57-17872 discloses a damper device for a steering shaft, which is constructed by inserting an inner tube with an oval cross section into an outer tube with a circular cross section, filling the gap therebetween with a vibration-absorbing member such as rubber, press-fitting a shaft with an oval cross-section into said inner tube with an elastic member, forming a penetrating hole in said tube, and inserting a stopper pin in said penetrating hole and through said inner tube and said shaft in such a manner as to allow a relative movement between said inner tube and said outer tube.

In the torque transmitting assembly disclosed in the above-mentioned U.S. Pat. No. 3,878,695, the notch of the tubular member engaging with the projection of the washer is provided at an end of the tubular member opposite to the end thereof constituting the yoke of a universal joint, and the sleeve consisting of elastomer material is directly fixed to the tubular member, so that the engaging part of the washer has to be formed outside of the sleeve, namely at the far side of the shaft. For this reason the assembly inevitably becomes long and heavy. The assembly is therefore not desirable for being incorporated in a limited space of the vehicle, and does not contribute to the weight reduction thereof. Also, in order to prevent slippage between the sleeve consisting of elastomer material and the tubular member, said sleeve has to be directly adhered to the inner face of the tubular member. However, the adhering step is difficult to automate if the shaft is relatively long, thus leading to a manufacturing increase. Also, the washer cannot be assembled with the tubular member after being fixed to the shaft in advance, but requires complicated assembling steps, with an increased cost. In addition, the circumferential gap between the projection of the washer and the notch of the tubular member is determined by the positional accuracy during assembling, so that the gaps at right and at left may become unbalanced. Consequently, the projecting portion of the washer and the notch of the tubular member are mutually engaged with a smaller torque in one rotating direction than in the other rotating direction. Thus, when a large torque is involved, for example, rotating the steering wheel while the vehicle is stopped, the rotating angle of the steering wheel until the tubular member comes into contact with the washer becomes different in both rotating directions, thereby undesirably affecting the feeling of driving. At the side with the smaller gap, the contact between metals takes place even under a small torque, thus transmitting the vibration to the steering wheel, and a vibration absorbing effect balanced in both directions cannot be achieved.

Also, in the damper device for the steering shaft disclosed in the Japanese Laid-open Utility Model No. 57-17872, a vibration absorbing material such as rubber is fixed between an inner tube and an outer tube, said outer tube is welded to the yoke, and a stopper pin pressed into the shaft is loosely fitted in an axially elongated penetrating hole provided in said outer tube. In such case, the outer tube is axially long and is not made light in weight. Also, the axially elongated penetrating hole in the outer tube and the hole provided in the shaft for pressing in the stopper pin cannot be simultaneously prepared in other, the components have to be separately manufactured and then assembled. Thus, due to manufacturing error or assembling error, the circumferential gap at either side of the stopper pin cannot be made equal, so that the above-mentioned drawbacks are unavoidable.

SUMMARY OF THE INVENTION

In consideration of the foregoing, the object of the present invention is to provide an elastically coupled joint having, in both directions of rotation an equal angle from an unloaded state to the engagement with a stopper, and thus equal vibration absorbing ability.

The elastically coupled joint of the present invention is essentially composed of a shaft for transmitting rotary motion, a housing in which said shaft is concentrically inserted, an elastic member provided between said shaft and said housing, and a stopper for preventing excessive displacement between said shaft and said housing, wherein:

said housing is provided, at an end thereof, with a yoke for supporting a spider of a universal joint;

said elastic member is provided with a tubular outer ring and a cylindrical elastic body fixed on the inner side of said outer ring;

said shaft is pressure fitted into the central portion of said elastic member; and said stopper is composed of a pin member inserted in aligned diametric penetrating holes formed in said housing, said elastic member and said shaft, said pin member being press fitted, for example, in said shaft with a uniform gap between the end portions of said pin member and the penetrating hole in said housing and said outer ring about the entire periphery of said pin member end portions.

According to the present invention, the structure is simplified since an end of the housing constitutes the yoke of a universal joint. Also, since the pin member is positioned close to the yoke and since the elastic member has a tubular outer ring, the length of press fitting between the housing and the elastic member can be reduced, yet remaining capable of providing a holding force sufficient to prevent slippage between the housing and the outer ring during use of the joint. Also, since the pin member is pressed in after the housing, the elastic member and the shaft are assembled together and a penetrating hole is formed through said three components (to form the respective penetrating holes thereof), the gap between the pin member and the penetrating hole in the housing is uniform about the entire periphery.

DETAILED DESCRIPTION OF THE PREFERRED EMBODIMENTS

The present invention will now be described in detail with reference to the embodiments thereof shown in the attached drawings.

Figure 1:
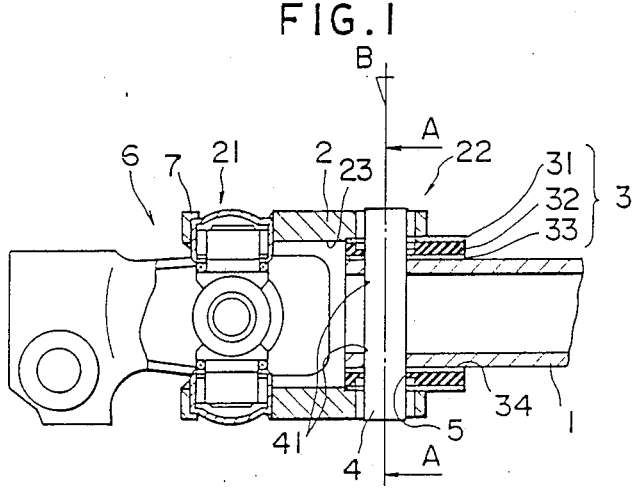
FIG. 1 is a longitudinal cross-sectional view of a first embodiment of the present invention.
Figure 2:
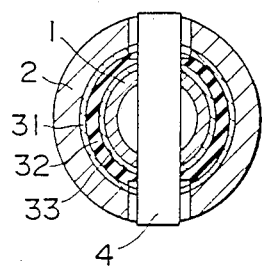
FIG. 2 is a cross-sectional view along a line A-A in FIG. 1.
Figure 3:
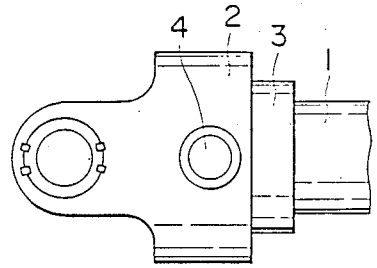
FIG. 3 is a view seen from a direction B shown in FIG. 1.

A first embodiment of the invention is shown in FIGS. 1 to 3.

An end portion 21 of a housing 2 constitutes a yoke 7 of a universal joint 6. Into the internal diameter portion 23 of the other housing end portion 22, there is press fitted an elastic member 3, consisting of a tubular outer ring 31, a tubular inner ring 33 and an elastic material 32 filled therebetween. Member is fitted into housing 2 in such a manner as to partly protrude from the end portion 22 of the housing 2, and a shaft 1 is pressed into the internal hole 34 of said elastic member 3. At this phase of assembly, a penetrating hole 5 is formed through housing 2, elastic member 3 and shaft 1 whereby these components are provided with respective diametric through holes in alignment with one another. The diameter of the penetrating hole 5 is determined, in the shaft 1 and the inner ring 33, at a size enabling press fitting of a stopper pin 4, but in the housing 2 and the outer ring 31, at a slightly larger size in order to have a predetermined gap around the stopper pin 4. After the cylindrical stopper pin 4 is inserted into the penetrating hole 5, and fitted into the shaft 1 by press insertion, a portion 41 of the stopper pin 4 present inside the shaft 1 is fixed by caulking in order to prevent extraction. Said caulking may however be dispensed with, because the stopper pin 4 is press fitted into the shaft 1.

In the above-explained structure, the vibration transmitted to the housing 2 through the universal joint is absorbed by the elastic member 3 and is not usually transmitted to the shaft 1. However, in the presence of an excessive torque or an excessive force in the axial direction of the shaft 1, the stopper pin 4 comes into contact with the penetrating hole 5 of the housing 2, thereby transmitting such torque or force. Since the elastic member 3 is composed of an outer ring 31 and an inner ring 33 filled therebetween with the elastic material 32, it can be assembled independently, and the automated assembling of the joint is also easily possible.

In the present embodiment, the stopper pin 4 is pressed into the shaft 1, but it is also possible to adopt a structure in which the stopper pin 4 is pressed into the penetrating hole of the housing 2 and has a predetermined gap to the penetrating hole of the shaft 1.

Figure 4:
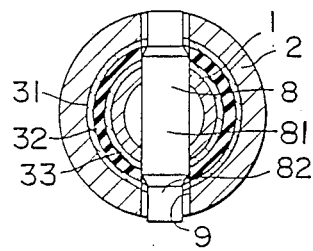
FIG. 4 is a cross-sectional view, corresponding to FIG. 2, of a second embodiment.

In the following there will be given an explanation of a second embodiment shown in FIG. 4.

In this embodiment a penetrating hole 9 is of the same diameter over the entire length thereof, while a stopper pin 8 has portions 82 of a concentrically reduced diameter at both ends as compared with a central portion 81, in order to have a predetermined gap with respect to the housing 2 and the outer ring 31. Thus the stopper pin 8 pressed into the shaft 1 and the inner ring 33 has, between the reduced-diameter portions and the housing 2, a uniform gap about its entire periphery. Also, the preparation of the penetrating hole is easy.

Figure 5:
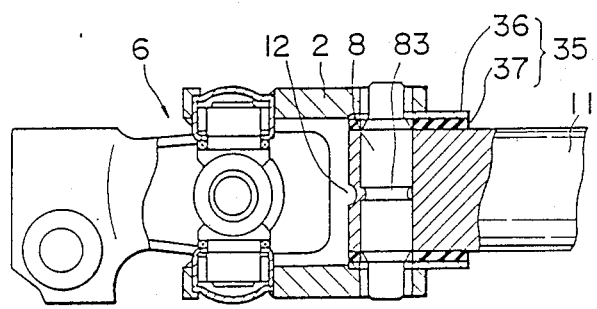
FIG. 5 is a longitudinal cross-sectional view of a third embodiment.
Figure 6:
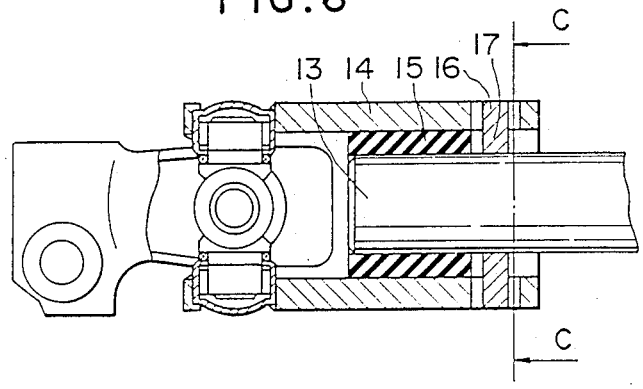
FIG. 6 is a longitudinal cross-sectional view of a conventional joint.
Figure 7:
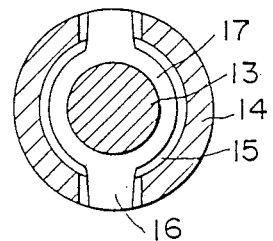
FIG. 7 is a cross-sectional view along a line C-C in FIG. 6.

In the following there will be explained a third embodiment shown in FIG. 5.

In this embodiment, the elastic member 35 is composed of a tubular outer ring 36 and an elastic body 37 adhered to the inside thereof, and 9 shaft 11 is pressed in or pressed and adhered in the elastic body 37. The stopper pin 8 is pressed into the shaft 11, and is fixed at an end face 12 for preventing extraction, whereby the end face of the shaft 11 is made to intrude in a groove 83 formed at the center of the stopper pin 8. However, said fixing may be dispensed with since the stopper pin 8 is press fitted into the shaft 11.

The present invention is naturally subject to various modifications within the spirit thereof.

As explained in the foregoing, the joint of the present invention, in comparison with the conventional joint, can reduce the length of press fitting between the housing and the elastic member. Thus the length of housing excluding the yoke portion can be reduced to less than half, and the weight of the entire joint can be reduced by about a quarter. Also, as the elastic member is formed by adhering a tubular elastic body inside a tubular outer ring, the manufacturing process can be easily automated, and there can be obtained a compact, lightweight and inexpensive shaft joint.

Further, since the stopper pin is pressed in after a penetrating hole is formed in an assembly of the housing, elastic member and shaft, the gap between the stopper pin and the housing or shaft can be uniform over the entire periphery. Consequently, the angle of rotation of the elastically coupled joint from the unloaded state to the state of engagement of the stopper is the same in both directions of rotation, and the vibration absorbing ability is the same in both rotating directions, so that the feeling of steering is satisfactory.

We claim:

1. In a steering mechanism of a vehicle, an elastically coupled joint connecting a shaft and a universal joint, said elastically coupled joint comprising:

a yoke having a first end connected to a spider of the universal joint and tubular second end in which an end of said shaft is concentrically received, an annular elastic torque transmitting assembly disposed concentrically between and in press-fitted engagement with said second yoke end and said shaft end, and coupling said second yoke end and said shaft end for torque transmission therebetween, said torque transmitting assembly projecting axially outwardly beyond said second yoke end and including an outer ring press-fitted within said second yoke end and an annular elastic body fixed circumferentially about the inner periphery of said outer ring, said second yoke end, said torque transmitting assembly, and said shaft end having respective diametric through holes aligned with one another, and a stopper pin received in said through holes and extending between diametrically opposite wall portions of said second yoke end, with said pin being press-fitted to one of said shaft end and said opposite wall portions of said second yoke end, and received by the other of said shaft end and said opposite wall portions of said second yoke end with a predetermined annular gap about the pin circumference.

2. An elastically coupled joint according to claim 1, wherein all of said through holes are of the same diameter, and said pin has a central portion press fitted to said shaft and has reduced diameter opposite end portions received in said opposite wall portions of said second yoke end with said predetermined gap.

3. An elastically coupled joint according to claim 2, wherein said opposite end portions of said pin also extend through said outer ring with said predetermined gap.

4. In a steering mechanism of a vehicle, an elastically coupled joint connecting a shaft and a universal joint, said elastically coupled joint comprising:

a yoke having a first end connected to a spider of the universal joint and a tubular second end in which an end of said shaft is concentrically received, an annular torque transmitting assembly disposed concentrically between said second yoke end and said shaft end, and coupling said second yoke end and said shaft end for torque transmission therebetween, said torque transmitting assembly projecting axially outwardly beyond said second yoke end and including an outer ring press fitted within said second yoke end, an inner ring press fitted on said shaft end, and an annular elastic body fixed to the inner periphery of said outer ring and to the outer periphery of said inner ring, said second yoke end, said torque transmitting assembly, and said shaft end having respective diametric through holes aligned with one another, and a stopper pin disposed in said through holes and having a central portion press-fitted in said shaft end and opposite end portions received by opposite wall portions of said second yoke end with a predetermined annular gap about said end portions.

5. An elastically coupled joint according to claim 4, wherein said opposite end portions of said pin extend through said outer ring with said predetermined gap.

6. An elastically coupled joint according to claim 5, wherein said holes are all of the same diameter and said opposite end portions of said pin are of a reduced diameter relative to said central portion of said pin.

* * * * *